United States Patent
Farmanbar et al.

(10) Patent No.: US 8,731,028 B2
(45) Date of Patent: May 20, 2014

(54) METHOD AND APPARATUS FOR MODULATION AND CODING SCHEME ADAPTION IN A MIMO SYSTEM

(75) Inventors: Hamidreza Farmanbar, Ottawa (CA); Aaron Callard, Ottawa (CA); Mohammadhadi Baligh, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 96 days.

(21) Appl. No.: 13/310,627

(22) Filed: Dec. 2, 2011

(65) Prior Publication Data

US 2013/0142290 A1    Jun. 6, 2013

(51) Int. Cl.
     *H04L 1/00*      (2006.01)

(52) U.S. Cl.
     USPC ............. 375/148; 375/285; 375/346

(58) Field of Classification Search
     USPC ......... 375/147, 148, 260, 267, 285, 340, 346, 375/347, 349, 350
     See application file for complete search history.

(56) References Cited

U.S. PATENT DOCUMENTS

| | | | |
|---|---|---|---|
| 2006/0023775 A1 | 2/2006 | Rimini et al. | |
| 2006/0291582 A1* | 12/2006 | Walton et al. | 375/267 |
| 2007/0201568 A1 | 8/2007 | Bae et al. | |
| 2011/0299379 A1* | 12/2011 | Sesia et al. | 370/203 |
| 2012/0314649 A1* | 12/2012 | Forenza et al. | 370/328 |
| 2013/0061106 A1* | 3/2013 | Shirani-Mehr et al. | 714/749 |

FOREIGN PATENT DOCUMENTS

| | | |
|---|---|---|
| CN | 101023594 A | 8/2007 |
| CN | 101958770 A | 1/2011 |

OTHER PUBLICATIONS

Written Opinion of the International Searching Authority received in International Application No. PCT/CN2012/085717, mailed Mar. 14, 2013, 5 pages.

International Search Report from the Patent Cooperation Treaty received in International Application No. PCT/CN2012/085717, mailed Mar. 14, 2013, 12 pages.

* cited by examiner

*Primary Examiner* — Dac Ha
(74) *Attorney, Agent, or Firm* — Slater & Matsil, L.L.P.

(57) ABSTRACT

Method and apparatus for decoding a transmitted signal by a receiver in a MIMO system into a first estimate component for estimating a first signal, a first interference component indicating interference resulting from a correlation relationship among a set of signals to be transmitted, and a first noise component. A base station generates the transmitted signal from the set of signals through a coding process, the coding process defining a correlation relationship amongst the set of signals. The correlation information about the correlation relationship is transmitted to the receiver directly or by a dedicated reference symbol. The decoding is performed by determining a linear receiver filter for the first signal in accordance with the correlation information, and de-correlating the first signal and interferences.

21 Claims, 3 Drawing Sheets

METHOD AND APPARATUS FOR MODULATION AND CODING SCHEME ADAPTION IN A MIMO SYSTEM

TECHNICAL FIELD

Embodiments of the present invention relate in general to modulation and coding scheme adaption as well as decoding for communication systems with correlated signals and interferences.

BACKGROUND

Multiple input, multiple output (MIMO) systems refer to communication systems that have multiple transmission and multiple reception antennas at both enhanced Node B (eNB) (or base station (BS), Node B (NB), communications controller, and so forth) and User Equipment (UE) (or mobile station (MS), terminal, user, relay, subscriber, subscriber equipment, and so on). Such MIMO systems can achieve better channel utilization and better overall performance. The Third Generation Partnership Project (3GPP) E-UTRA standards specify MIMO schemes for use by E-UTRA UEs and eNBs. Single-cell enhanced Multi-User MIMO (MU-MIMO) has been identified as an important technique for LTE Advanced (LTE-A) to improve system performance. In LTE Rel-8, Single-User MIMO (SU-MIMO) and MU-MIMO are supported by different transmission modes which are configured semi-statically by higher layer. In LTE Rel-9 and LTE Rel-10, transparent MU-MIMO can be supported.

In a typical Multi-User Multiple-Input Multiple-Output (MU-MIMO) system, a transmitter transmits a MU-MIMO signal, which comprises multiple signals that are addressed to multiple respective receivers. Each of the signals is precoded with a respective precoding scheme, and the signals are spatially-multiplexed and transmitted in the same time-frequency slot, therefore a signal to one receiver can cause more interference to another.

SUMMARY OF THE INVENTION

These and other problems are generally solved or circumvented, and technical advantages are generally achieved, by embodiments of a system and method for modulation and coding scheme adaption as well as decoding for communication systems with correlated signal and interference.

In accordance with an example embodiment, a method for signal processing in a communication system is provided. A base station eNB generates a transmitted signal from a set of signals through a coding process, and the set of signals $x=[x_1\ x_2\ \ldots\ x_K]^T$ comprises a first signal $x_j$ and a plurality of other signals. The coding process defines a correlation relationship amongst the first signal and the plurality of other signals in the set. The coding process used in generating the transmitted signal from the set of signals may comprise a linear or non-linear precoding performed by a precoder within the transmitter or the eNB, such as a dirty-paper non-liner precoding, a linear zero-forcing precoding, or a linear regularized zero-forcing precoding.

In accordance with an example embodiment, the transmitted signals may be targeted to multiple users or receivers in a MIMO system. A receiver receives the transmitted signal sent by the eNB or the transmitter through a channel. The receiver decodes the transmitted signal into a first estimate component for estimating the first signal, a first interference component caused by the correlation relationship among the set of signals, and a first noise component, wherein the decoding is performed in accordance with correlation information about the correlation relationship among the set of signals. The receiver may decode a second signal in addition to the first signal, by similarly decoding the received signal into a second estimate component for estimating a second signal of the set of signals, a second interference component caused by the correlation relationship among the set of signals, and a second noise component.

In accordance with an example embodiment, the correlation information about the correlation relationship among the set of signals used in decoding by the receiver may be sent directly by the transmitter using a pilot signal or a control signal. Alternatively, the correlation information may be sent by the transmitter using a dedicated reference symbol (DRS). The correlation information may be a correlation matrix $R_x=E[xx^H]$ or $D=\text{diag}(R_x)^{-1}$, wherein $x=[x_1\ x_2\ \ldots\ x_K]^T$ is the set of signals.

In accordance with an example embodiment, the decoder within the receiver may perform decoding by determining a linear receiver filter for the first signal in accordance with the received correlation information, and de-correlating the first signal and interferences to generate the first estimate component of the first signal, the first interference component, and the first noise component. The de-correlation of the first signal and the interferences may be derived through usage of a Cholesky factorization process.

In accordance with an example embodiment, the linear receiver filter for the first signal $x_j$ may be as $r_{1 \times N}$, where $r_{1 \times N}=[R_x]_{jth\ row} H^H (HR_xH^H+R_n)^{-1}$, wherein $x=[x_1\ x_2\ \ldots\ x_K]^T$ is the set of signals, $R_x=E[xx^H]$ is a correlation matrix of $x=[x_1\ x_2\ \ldots\ x_K]^T$, H represents a combined impact of the channel and the coding process, and the channel H has a noise vector n with a correlation matrix $R_n=E[nn^H]$. The linear receiver filter for the first signal $x_j$ may be of other forms such as $s^* r_{1 \times N} = s^*[R_x]_{jth\ row} H^H (HR_xH^H+R_n)^{-1}$, wherein a scalar number is denoted as s.

In accordance with an example embodiment, the receiver decodes the first estimate component for the first signal $x_j$ to be $$\frac{1}{[R_x]_{jj}} rH[R_x]_{jth\ column} x_j,$$

the first interference component to be $$rHx - \frac{1}{[R_x]_{jj}} rH[R_x]_{jth\ column} x_j,$$

and a signal to interference and noise ratio (SINR) for the first signal to be $$SINR = \frac{\frac{1}{[R_x]_{jj}} |rH[R_x]_{jth\ column}|^2}{rHR_xH^Hr^H - \frac{1}{[R_x]_{jj}} |rH[R_x]_{jth\ column}|^2 + rR_nr^H}$$

In accordance with an example embodiment, an apparatus for signal processing in a communication system is provided. The apparatus comprises a receiver configured to receive a transmitted signal sent by a transmitter through a channel, wherein the transmitted signal is generated from a set of signals through a coding process, and wherein the set of signals comprises a first signal and a plurality of other signals with a correlation relationship after the coding process. The apparatus further comprises a processor configured to decode, in accordance with a correlation information about the correlation relationship among the set of signals, the received signal into a first estimate component for estimating the first signal, a first interference component caused by the correlation relationship among the set of signals, and a first noise component. The receiver is configured to receive the correlation information about the correlation relationship among the set of signals from the transmitter; and the processor is configured to generate a linear receiver filter for the first signal; and to de-correlate the first signal and interferences to generate the first estimate component of the first signal, the first interference component, and the first noise component.

In accordance with an example embodiment, an apparatus for signal processing in a communication system is provided. The apparatus comprises a processor configured to generate a transmitted signal from a set of signals through a coding process, wherein the set of signals comprises a first signal and a plurality of other signals with a correlation relationship after the coding process. The apparatus further comprises a transmitter to send the transmitted signal through a channel, and to send a correlation information about the correlation relationship among the set of signals through the channel, wherein the correlation information is related to a first interference component of the transmitted signal caused by the correlation relationship among the set of signals. The apparatus may send the correlation information using a pilot signal, a control signal, or a dedicated reference symbol (DRS).

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
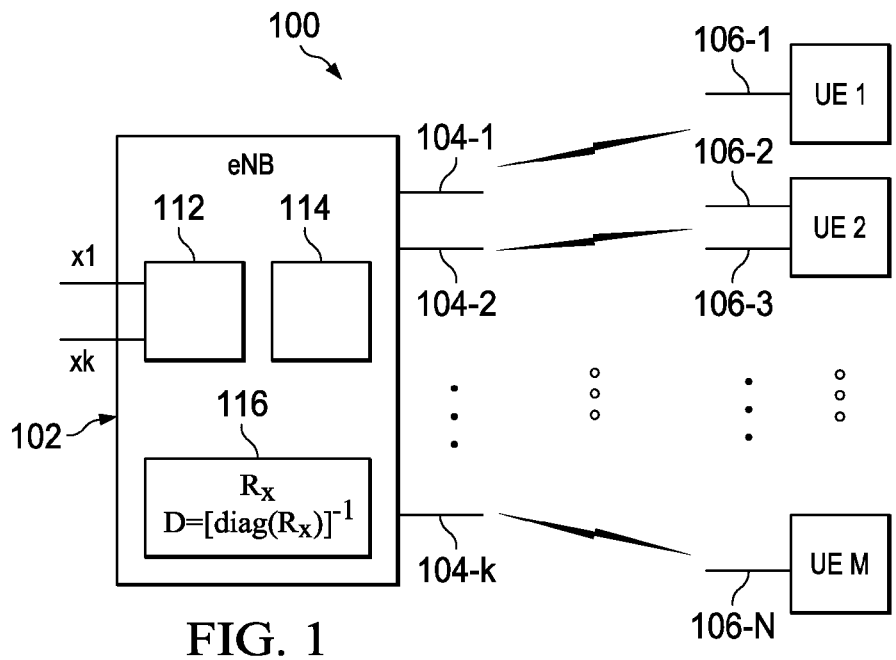
FIG. 1 illustrates an example of a MIMO system with an eNB and a plurality of receivers.

In a multi-user multiple input multiple output (MU-MIMO) system, a base station (eNB) serves one or more user equipments (UEs) simultaneously by transmitting communication signals to one or more UEs. FIG. 1 illustrates an example MU-MIMO system 100. MU-MIMO system 100 may be a downlink MU-MIMO system, but it is not limited to such a system. MU-MIMO system 100 comprises an eNB 102 which has one or more transmission antennas 104-1, 104-2, ..., 104-K to transmit a signal vector $x=[x_1 \ x_2 \ldots x_K]^T$. A signal vector $x=[x_1 \ x_2 \ldots x_K]^T$, a plurality of signals $x=[x_1 \ x_2 \ldots x_K]^T$, a set of signals, or signals $x=[x_1 \ x_2 \ldots x_K]^T$ may be used to mean the same $x=[x_1 \ x_2 \ldots x_K]^T$, which comprises a plurality of signals $x_j$. eNB 102 may transmit the signal vector via transmission antennas 104-1 to 104-K to one or more receivers UE1, UE2, ... UEM, which may each have one or more reception antennas 106-1, 106-2, ..., 106-N. The number of antennas may not be the same as the number of signals to be transmitted. Each of the receivers UE1 to UEM may be capable of transmitting signals to the base station. Different UEs may have different number of antennas. The number of UEs, the number of antennas for the eNB and the UEs, are only shown for illustrative purposes and are not limiting. There may be other number of UEs with other number of antennas can be used in the system.

The base station eNB 102 may be a wireless transmitter (e.g., cellular site, satellite, etc.) connected to a network (not shown). The eNB 102 may include a precoder 112 for pre-coding signals transmitted by transmission antennas 104-1 to 104-K, a scheduler 114 for scheduling one or more transmissions, and a correlation transmitter 116 for transmitting signal correlation information. The functions of the precoder 112, the scheduler 114, and the transmitter 116 may be implemented by an example controller 500 illustrated in FIG. 5. The group of users UE1 to UEM is selected by the scheduler 114 for the transmission. There may be a different number of UEs connected to eNB 102 but some of them may not be selected for transmission. In some embodiments, eNB 102 may comprise multiple transmitters, each with multiple precoders 112 and transmission antennas. Further, eNB 102 may comprise one or more reception antennas and inputs (not shown) for receiving input data and feedback signals, etc. and one or more controllers and/or or appropriate control circuitry, symbol generators, multiplexers, etc.

Precoder 112 may be capable of performing precoding functions on each of signals $x=[x_1 \ x_2 \ldots x_K]^T$, $x_j$. That is, the precoder 112 may design, determine, and implement a precoder or a codebook for use in signal transmission by eNB 102. The precoder 112 may precode each signal $x_j$ sequentially or in parallel. Precoding algorithms used in MU-MIMO may be divided into non-linear and linear precoding types. A non-linear precoding technique may be the so-called Dirty-Paper Coding (DPC) which pre-cancels the interference of the signal transmitted by the transmitter without any power penalties. Linear precoding includes zero-forcing (ZF) and Regularized Zero-Forcing (R-ZF) precoding. Zero-forcing (ZF) technique requires that the transmitter know the downlink channel state information. Accordingly, in the case of limited or inaccurate channel state information, Regularized Zero-Forcing (R-ZF) precoding may be used to compensate unfavorable channel conditions.

Each of signals $x=[x_1 \ x_2 \ldots x_K]^T$, $x_j$, comprises a sequence of modulated symbols, which carry data addressed to respective UE. Any suitable modulation scheme, such as Quadrature Phase Shift Keying (QPSK) or Quadrature Amplitude Modulation (QAM), can be used. The data conveyed by each signal is typically encoded with an Error Correction Code (ECC). The choice of modulation and ECC used in a given signal is referred to as a Modulation and Coding Scheme (MCS). The set of signals $x=[x_1 \ x_2 \ldots x_K]^T$ may be each precoded, encoded with ECC schemes, and modulated, and finally multiplexed together to form a transmitted signal, which is to be transmitted by eNB 102 to the UEs. For a first signal $x_j$, the transmitted signal comprises a first estimate component of $x_j$, and a first interference component to indicate the amount of interference caused by the correlation relationship among the signals $x=[x_1 \ x_2 \ldots x_K]^T$ after the coding process. When the transmitted signal is received by a UE through a channel, the received transmitted signal has a third component which is a noise component to indicate the impact of the noise of the channel.

The eNB 102 may further comprise a correlation transmitter 116. The signal vector $x=[x_1\ x_2\ \ldots\ x_K]^T$ precoded by the precoder 112 may have a correlation relationship. Such a correlation relationship may be represented by a correlation matrix $R_x=E[xx^H]$, which may be transmitted by the pilot or control signals to the UEs through one or more of the plurality of transmit antennas. Other forms of correlation information can be represented as well. For example, a matrix may be defined as $$D = \text{diag}(R_x)^{-1},$$
$$\text{i.e., } [D]_{kk} = \frac{1}{[R_x]_{kk}}, k = 1, \ldots, K.$$

The correlation information, being it as the correlation matrix $$R_x = E[xx^H] \text{ or } D = \text{diag}(R_x)^{-1},$$
$$\text{i.e., } [D]_{kk} = \frac{1}{[R_x]_{kk}}, k = 1, \ldots, K,$$

provides information about the first interference component of the transmitted signal to indicate the amount of interference caused by the correlation relationship among the signals $x=[x_1\ x_2\ \ldots\ x_K]^T$ after the coding process. The first interference component of the transmitted signal may be identified at the receiver by decoding the received signals. At the transmitter, the dedicated reference symbols (DRS) may be precoded by $R_xD$ and transferred to UEs. The detailed functions of those units scheduler 114, precoder 112, and a correlation transmitter 116 may be implemented by a controller 500 shown in FIG. 5, wherein a processor 502 may be configured to perform each of the functions. The processor 502 may be an ASIC, a general purpose processor, a Digital Signal Processor, a combination of processors, a processor with dedicated circuitry, dedicated circuitry functioning as a processor, and a combination thereof.

Prior to transmitting data signals, eNB 102 usually transmits pilot or control signals to the UEs through one or more of the plurality of transmit antennas. Based at least in part on signals (e.g., pilot signals) received from the eNB 102, each individual UE estimates a condition of the wireless channels between the eNB 102 and the UE. For example, UE1 estimates a channel matrix $H_1$, which is representative of quality of a wireless communication channel between the eNB 102 and the UE1. Similarly, UE2, . . . , UEM estimate respective channel matrices $H_2, \ldots, H_M$ that are representative of quality of respective wireless communication channels.

The eNB 102 transmits the transmitted signal generated from the precoded, which may include modulation and ECC, signal vector $x=[x_1\ x_2\ \ldots\ x_K]^T$, through the antennas 104-1, 104-2, . . . , and 104-k. The transmitted signal is received by the N receiving antennas 106-1, . . . , 106-N of M receivers, which will be decoded.

Receivers UE1 to UEM may be wireless reception devices (e.g. mobile telephone, ground station, etc.) as are known and may be capable of receiving and decoding (e.g., demultiplexing) signals $y=[y_1\ y_2\ \ldots\ y_N]^T$ received at reception antennas 106-1 to 106-N as well as transmitting feedback (e.g., quantized feedback) to eNB 102. It is understood that this feedback transmission may be wired and wireless over feedback links and may be transmitted using a combination of reception antennas 106-1 to 106-N.

Combined together for all users UE1 to UEM, the MIMO system 100 may be described by $$y_{N \times 1} = H_{N \times K} x_{K \times 1} + n_{N \times 1}, \quad (1)$$

where $x=[x_1\ x_2\ \ldots\ x_K]^T$ is the set of signals which are precoded and processed to generate the transmitted signal, a first signal may be any of the signals $x_j$, $y=[y_1\ y_2\ \ldots\ y_N]^T$ is the received signal after decoded by the UEs, H represents combined channel and precoder, and $n=[n_1\ n_2\ \ldots\ n_N]^T$ is the noise for the channel H. The set of signals x has correlation matrix $R_x=E[xx^H]$. The noise vector n has correlation matrix $R_n=E[nn^H]$.

A receiver may be only interested in decoding a subset of the elements of x. For simplicity in presentation, a receiver is assumed to be only interested in decoding $x_j$. Then all other elements of x will be considered as interference for the receiver. If the receiver is interested in decoding more than one element, the same approach presented below can be used repeatedly to decode the other desired elements.

The system model described above covers the downlink MU-MIMO scenario where the transmitted signal contains signal for all receivers and each receiver is only interested in decoding its own signal. In many MU-MIMO systems, the transmitted signal generated from the set of signals x will be correlated due to precoding or other reasons. It is assumed that the correlation matrix $R_x$ or some other form of correlation information is known at the receiver. Methods for conveying the correlation information from the transmitter to the receiver will be described below.

Figure 2A:
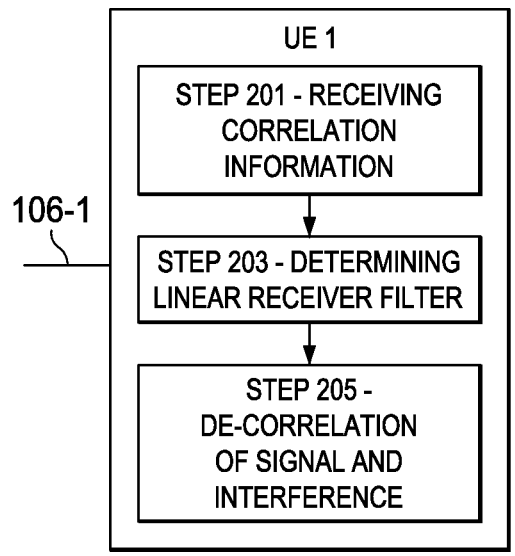
Figure 2B:
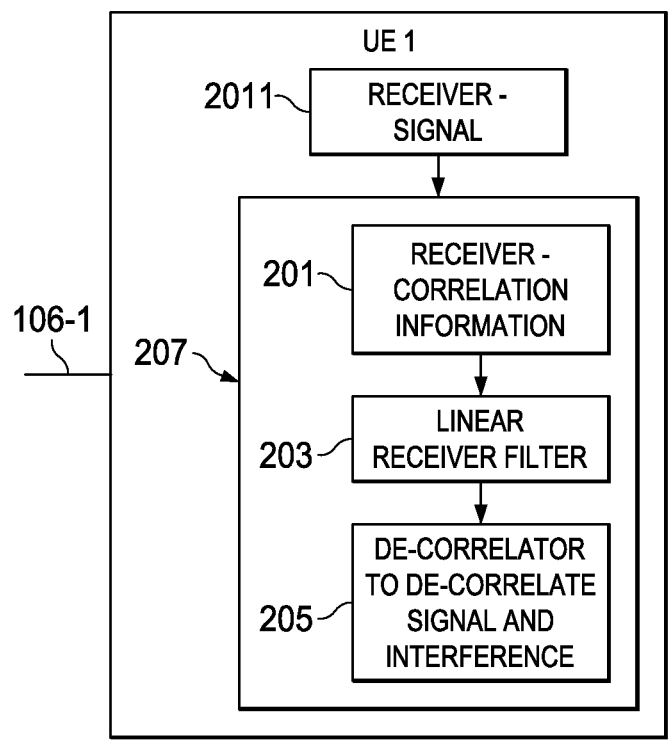

FIGS. 2(a)-2(b) illustrate an example structure of a receiver UE1. It may be other receivers instead of UE1. The receiver UE1 comprises an antenna 106-1. The receiver UE1 may comprise other numbers of antennas. The receiver UE1 shown in FIG. 2(a) illustrates the steps performed within the receiver. The first step is to receive at step 201 signal correlation information generated by the eNB by the unit 116. The second step is to determine at step 203 a linear receiver filter for the first signal to be estimated. The third step is to de-correlate the first signal and interferences at step 205. On the other hand, the receiver UE1 may comprises a receiver 2011 to receive the transmitted signal sent by the transmitter, a receiver 201 to receive the correlation information, a liner receiver filter 203, and a de-correlator 205 to de-correlate the first signal and interferences, as shown in FIG. 2(b), where the receiver 201, the linear receiver filter 203, and a de-correlator 205 form a decoder 207. The detailed functions of those units 2011, 201, 203, and 205 may be implemented by a controller 500 shown in FIG. 5, wherein a processor 502 may be configured to perform each of the functions shown in FIG. 2(b). The processor 502 may be an ASIC, a general purpose processor, a Digital Signal Processor, a combination of processors, a processor with dedicated circuitry, dedicated circuitry functioning as a processor, and a combination thereof.

According to the embodiments shown in FIGS. 2(a) and 2(b), after the de-correlation, the signal received by UE1 is decomposed into three parts, a first estimate component of $x_1$, the intended or desired signal, or the first signal for UE1, a second interference component to indicate the amount of interference caused by the correlation relationship among the signals $x=[x_1\ x_2\ \ldots\ x_K]^T$ after the coding process, and a third component which is a noise component to indicate the impact of the noise. The second interference component to indicate the amount of interference caused by the correlation relationship among the signals $x=[x_1\ x_2\ \ldots\ x_K]^T$ is related to the first interference component of the transmitted signal.

In one embodiment, the receiver 201 may receive the correlation matrix $R_x=E[xx^H]$ at step 201. Afterwards linear receiver filters 203 may be determined at step 203. Examples of linear receiver filters are zero forcing (ZF) and minimum mean square error (MMSE). There may be other receiver filters used at the receiver. A MMSE receiver filter for the first signal which takes into account the correlation of the transmitted signal is given by $$r_{1 \times N} = [R_x]_{jth\ row} H^H (H R_x H^H + R_n)^{-1} \quad (2)$$

Subsequently, the de-correlator 205 performs de-correlation of the first signal and interferences at step 205. The following illustrates such an example of performing de-correlation of the first signal and interferences.

Suppose a receiver filter $r_{1 \times N}$ has been used by the receiver to decode $x_j$. The correlation of data vector x can be used in order to enhance the signal power at receivers. Let $R_x$ be decomposed as $$R_x = G_j G_j^H. \quad (4)$$

For j=1, $G_j$ is simply a lower triangular matrix with real elements on the diagonals obtained from Cholesky decomposition of $R_x$. For j>1, the form of $G_j$ is as follows: starting with a lower triangular matrix form, switch j-th row with first row and then switch j-th column with first column. For example, for K=3, $G_j$s will have the forms $$G_1 = \begin{bmatrix} j_1 & 0 & 0 \\ j_2 & j_3 & 0 \\ j_4 & j_5 & j_6 \end{bmatrix}, G_2 = \begin{bmatrix} h_1 & h_2 & 0 \\ 0 & h_3 & 0 \\ h_4 & h_5 & h_6 \end{bmatrix}, G_3 = \begin{bmatrix} i_1 & i_2 & i_3 \\ i_4 & i_5 & 0 \\ 0 & 0 & i_6 \end{bmatrix}.$$

In any of the above forms, the diagonal elements have real values.

From (4) and given the form of $G_j$, it can easily be verified that $$[G_j]_{jth\ column} = \frac{1}{\sqrt{[R_x]_{jj}}} [R_x]_{jth\ column} \quad (5)$$

Making the following whitening transformation $$v = G_j^{-1} x, \quad (6)$$

which makes v white:

$$R_{vv} = E[vv^H] = I_K. \quad (7)$$

Furthermore, from the form of $G_j$, it has $$x_j = \sqrt{[R_x]_{jj}} v_j. \quad (8)$$

Using the transformation (6), the processed received signal can be written as $$\tilde{y} = r H G_j v + \tilde{n} \quad (9)$$

$$= [rHG_j]_{1j} v_j + \underbrace{\sum_{k \neq j} [rHG_j]_{1k} v_k}_{interference} + \tilde{n}$$

$$= \underbrace{\frac{1}{\sqrt{[R_x]_{jj}}} [rHG_j]_{1j} x_j}_{signal} + \underbrace{\sum_{k \neq j} [rHG_j]_{1k} v_k}_{interference} + \tilde{n}$$

From (9), it can be seen that signal and interference has become uncorrelated and SINR adaptation and decoding can be done properly. In the following, Equation (9) is rewritten in term of $R_x$. Using (5), the first signal estimate term in (9) can be written as $$\text{first signal estimate component} = \frac{1}{\sqrt{[R_x]_{jj}}} [rHG_j]_{1j} x_j \quad (10)$$

$$= \frac{1}{\sqrt{[R_x]_{jj}}} rH[G_j]_{jth\ column} x_j$$

$$= \frac{1}{[R_x]_{jj}} rH[R_x]_{jth\ column} x_j$$

The first interference component is simply given by $$\text{first interference component} = rHx - \text{desired signal} \quad (11)$$

$$= rHx - \frac{1}{[R_x]_{jj}} rH[R_x]_{jth\ column} x_j$$

For MCS adaptation, we need to calculate the signal to interference and noise ratio (SINR). The desired signal power is given by $$\text{desired signal power} = \frac{1}{[R_x]_{jj}} |rH[R_x]_{jth\ column}|^2 \quad (12)$$

The interference power is given by $$\text{interference power} = rHR_x H^H r^H - \frac{1}{[R_x]_{jj}} |rH[R_x]_{jth\ column}|^2 \quad (13)$$

Finally, the SINR of the first signal is given by $$SINR = \frac{\frac{1}{[R_x]_{jj}} |rH[R_x]_{jth\ column}|^2}{rHR_x H^H r^H - \frac{1}{[R_x]_{jj}} |rH[R_x]_{jth\ column}|^2 + rR_n r^H} \quad (14)$$

As it can be seen from Equations (10)-(14), the desired signal, interference, and SINR are represented in terms of $R_x$.

It should be noted that the Cholesky factorization introduced in Eqn. (4) is only a tool to show how to de-correlate the first signal and interferences and it is not required to be done as part of signal processing at the receiver or the base station for either decoding or MCS adaptation.

Figure 3:
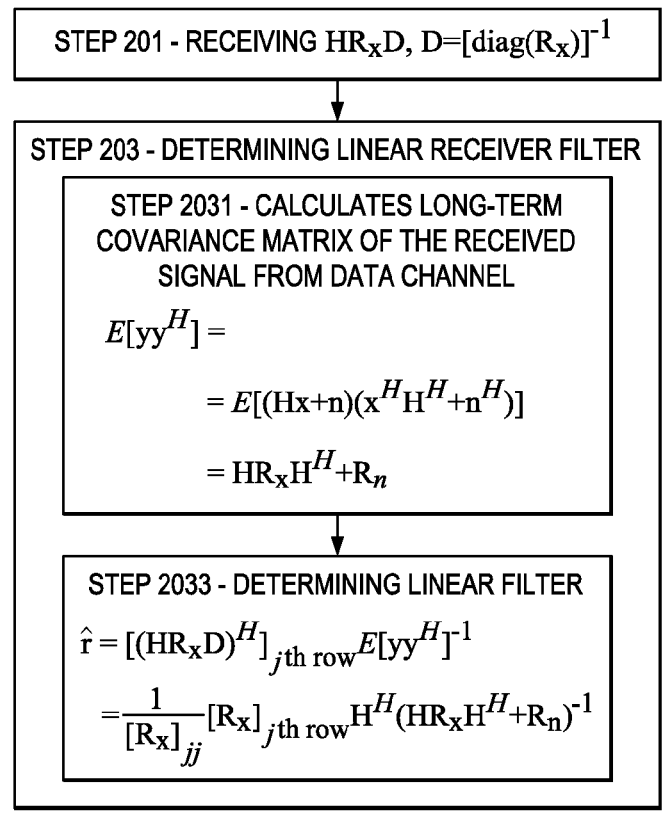
FIGS. 2-4 illustrate examples of operations performed by a receiver.

FIG. 3 illustrates the function of the receivers when the correlation information is sent in a different way, e.g., in terms of the matrix $$D = \text{diag}(R_x)^{-1}. \text{ Let } D = \text{diag}(R_x)^{-1}, \text{ i.e.,}$$

$$[D]_{kk} = \frac{1}{[R_x]_{kk}}, k = 1, \ldots, K.$$

At the transmitter, the dedicated reference symbols (DRS) are precoded by $R_x D$.

In FIG. 3, in step 201, the receiver receives and estimates $HR_xD$ from received DRS. Then the receiver proceeds to step 203 to determine the linear receiver filter which is done in two steps.

In Step 2031, the receiver calculates long-term covariance matrix of the received signal from data channel:

$$E[yy^H] = E[(Hx+n)(x^H H^H + n^H)] \quad (15)$$
$$= HR_xH^H + R_n$$

Then in step 2033, the optimal MMSE filter for the first signal at the receiver is calculated as $$\hat{r} = [(HR_xD)^H]_{jth\ row}E[yy^H]^{-1} \quad (16)$$
$$= [DR_xH^H]_{jth\ row}(HR_xH^H + R_n)^{-1}$$
$$= [DR_x]_{jth\ row}H^H(HR_xH^H + R_n)^{-1}$$
$$= \frac{1}{[R_x]_{jj}}[R_x]_{jth\ row}H^H(HR_xH^H + R_n)^{-1}$$

which is the same as Eqn. (2) except for a scaling factor which does not matter.

Subsequently in step 205 shown in FIG. 4, in order to calculate the desired first signal, the receiver multiplies its receiver filter as in Equation (16) by the j-th column of its channel estimate from receive DRS, i.e., $HR_xD$ to obtain the first signal estimate as follows:

$$\text{first signal estimate component} = \hat{r}[HR_xD]_{jth\ column}x_j \quad (17)$$
$$= \frac{1}{[R_x]_{jj}}\hat{r}[HR_x]_{jth\ column}x_j$$
$$= \frac{1}{[R_x]_{jj}}\hat{r}H[R_x]_{jth\ column}x_j$$

which is in line with Eqn. (10).

Figure 4:
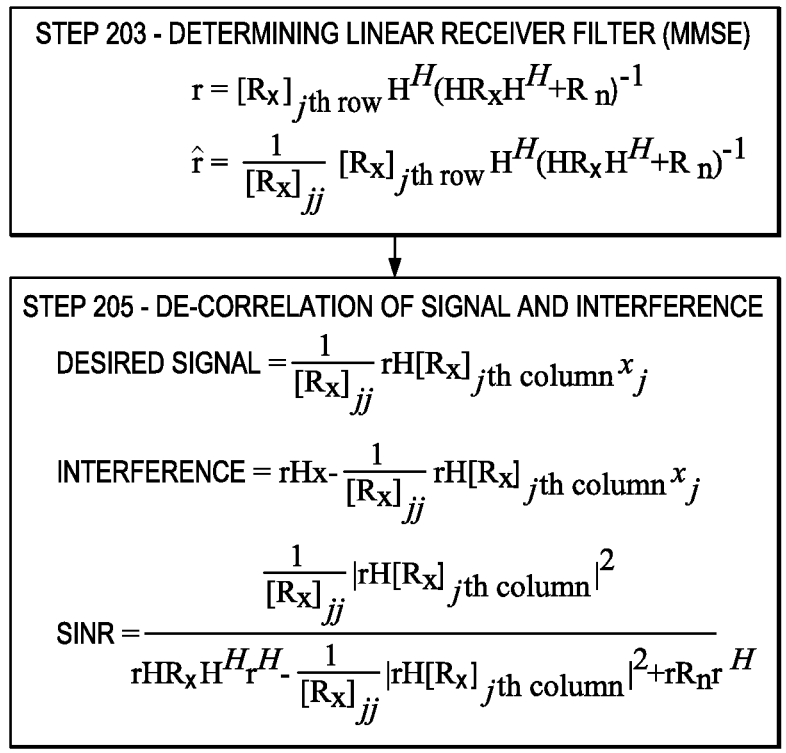

The above various processes may be collectively shown in FIG. 4 demonstrating the operation of the UE1 as illustrated in FIG. 2. In Step 201 of FIG. 2, there may be different forms of correlation information of the signals sent from the eNB 102 to the UE. In step 203, linear receiver filter may be decided as shown in FIG. 4. The difference between the two filters shown in step 203 in FIG. 4 is a scale factor. There may be other scale factors derived from different approaches, which do not change the substance of the process demonstrated in FIG. 2. Furthermore, the Step 205 in FIG. 4 shows the result of the desired signal, the interference, and the SINR are the same for different forms of the correlation information.

Figure 5:
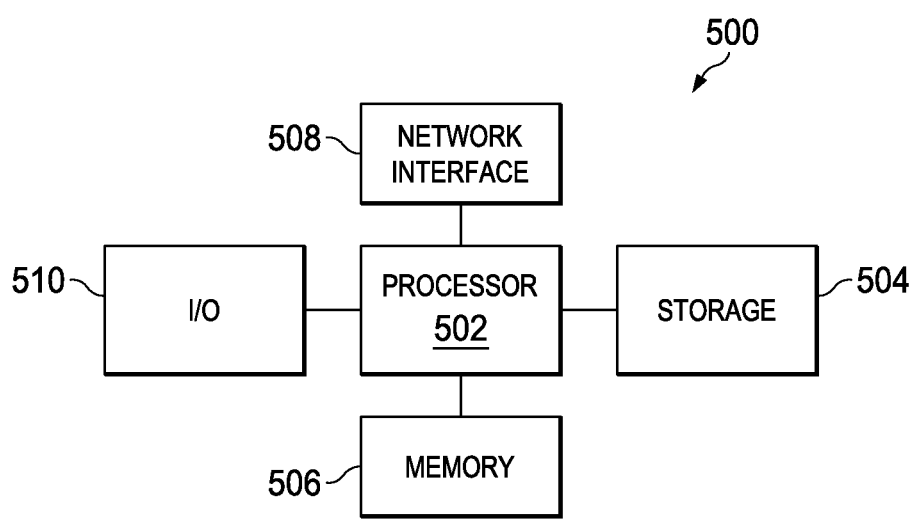
FIG. 5 illustrates an example of a controller implementing the operations performed by the eNB and the receiver.

FIG. 5 illustrates an example controller 500 according to an embodiment of the disclosure. Controller 500 may be used in conjunction with and may perform the functions of the eNB 102, the precoder 112, the scheduler 114, and the transmitter 116. In the same or alternative embodiments, controller 500 may reside at, be component of, or may be used by one or more UEs UE1 to UEM, to perform operations in step 201, 203, and 205 as shown in FIG. 2(a).

Controller 500 may contain a processor 502 which controls the overall operation of the controller 500 by executing computer program instructions which define such operation. The computer program instructions may be stored in a storage device 504 (e.g., magnetic disk, database, etc.) and loaded into memory 506 when execution of the computer program instructions is desired. Thus, applications for performing the herein-described method steps, such as precoding, scheduling, transmitting and receiving data are defined by the computer program instructions stored in the memory 506 or storage 504 and controlled by the processor 502 executing the computer program instructions. The controller 500 may also include one or more network interfaces 508 for communicating with other devices via a network (e.g., a peer to peer network, etc.). The controller 500 also includes input/output devices 510 (e.g., display, keyboard, mouse, speakers, buttons, etc.) that enable user interaction with the controller 500. Controller 500 and processor 502 may include one or more central processing units, read only memory (ROM) devices and/or random access memory (RAM) devices. The processor 502 may be an ASIC, a general purpose processor, a Digital Signal Processor, a combination of processors, a processor with dedicated circuitry, dedicated circuitry functioning as a processor, and a combination thereof. An implementation of an actual controller could contain other components as well, and that the controller of FIG. 5 is a high level representation of some of the components of such a controller for illustrative purposes.

In alternative embodiments, hard-wired circuitry or integrated circuits may be used in place of, or in combination with, software instructions for implementation of the processes of the present invention. Thus, embodiments of the present invention are not limited to any specific combination of hardware, firmware, or software. The memory 506 may store the software for the controller 500, which may be adapted to execute the software program and thereby operate in accordance with the present invention and particularly in accordance with the methods described in detail above. However, the invention as described herein could be implemented in many different ways using a wide range of programming techniques as well as general purpose hardware sub-systems or dedicated controllers.

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. The disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for signal processing in a communication system, comprising:
receiving, by a receiver, a transmitted signal sent by a transmitter through a channel, the transmitted signal being generated from a set of signals according to a coding process, the set of signals comprising a first signal and a plurality of other signals, the coding process defining a correlation relationship amongst the first signal and the plurality of other signals in the set, and including correlation information relating to the correlation relationship in the transmitted signal; and decoding, in accordance with the correlation information, the transmitted signal into a first estimate component for estimating the first signal, a first interference component indicating interference resulting from the correlation relationship, and a first noise component indicating impact of the noise on transmission of the first signal.

2. The method of claim 1, further comprising:
decoding the received signal into a second estimate component for estimating a second signal of the set of signals, a second interference component caused by the correlation relationship among the set of signals, and a second noise component.

3. The method of claim 1, wherein the transmitter is a base station of a multi-user multiple input, multiple output (MIMO) system, and the receiver is a user equipment within the multi-user MIMO system.

4. The method of claim 1, wherein the correlation information is received by the receiver from the transmitter using one of a pilot signal, a control signal, or a dedicated reference symbol (DRS).

5. The method of claim 1, wherein the coding process used in generating the transmitted signal from the set of signals comprises a linear zero-forcing precoding performed by a precoder within the transmitter.

6. The method of claim 1, wherein the coding process used in generating the transmitted signal from the set of signals comprises a linear regularized zero-forcing precoding performed by a precoder within the transmitter.

7. The method of claim 1, wherein the coding process used in generating the transmitted signal from the set of signals comprises a dirty-paper non-liner precoding performed by a precoder within the transmitter.

8. The method of claim 1, wherein the decoding the received signal comprises:
determining a linear receiver filter for the first signal; and
performing a de-correlation of the first signal and interferences to generate the first estimate component for estimating the first signal, the first interference component, and the first noise component.

9. The method of claim 8, wherein the correlation information is a correlation matrix $R_x = E[xx^H]$ or $D = \text{diag}(R_x)^{-1}$, wherein $x = [x_1 \, x_2 \ldots x_K]^T$ is the set of signals.

10. The method of claim 8, wherein the linear receiver filter for the first signal $x_j$ is $r_{1 \times N} = [R_x]_{jth\ row} H^H (HR_x H^H + R_n)^{-1}$, wherein $x = [x_1 \, x_2 \ldots x_K]^T$ is the set of signals, $R_x = E[xx^H]$ is a correlation matrix of $x = [x_1 \, x_2 \ldots x_K]^T$, H represents a combined impact of the channel and the coding process, and the channel H has a noise vector n with a correlation matrix $R_n = E[nn^H]$.

11. The method of claim 9, wherein the linear receiver filter for the first signal $x_j$ is $s^* r_{1 \times N} = s^* [R_x]_{jth\ row} H^H (HR_x H^H + R_n)^{-1}$, wherein a scalar number is denoted as s.

12. The method of claim 9, wherein the first estimate component for the first signal $x_j$ is $$\frac{1}{[R_x]_{jj}} rH[R_x]_{jth\ column} x_j.$$

13. The method of claim 9, wherein the first interference component is $$rHx - \frac{1}{[R_x]_{jj}} rH[R_x]_{jth\ column} x_j.$$

14. The method of claim 9, wherein a signal to interference and noise ratio (SINR) for the first signal is $$SINR = \frac{\frac{1}{[R_x]_{jj}} |rH[R_x]_{jth\ column}|^2}{rHR_x H^H r^H - \frac{1}{[R_x]_{jj}} |rH[R_x]_{jth\ column}|^2 + rR_n r^H}.$$

15. The method of claim 8, wherein the de-correlation of the first signal and the interferences is derived through usage of a Cholesky factorization process.

16. An apparatus for signal processing in a communication system, the apparatus comprising:
a receiver configured to receive a transmitted signal sent by a transmitter through a channel, the transmitted signal being generated from a set of signals according to a coding process, the set of signals comprising a first signal and a plurality of other signals, the coding process defining a correlation relationship amongst the first signal and the plurality of other signals in the set, and including correlation information relating to the correlation relationship in the transmitted signal; and
a processor configured to decode, in accordance with the correlation information, the transmitted signal into a first estimate component for estimating the first signal, a first interference component indicating interference resulting from the correlation relationship, and a first noise component indicating impact of the noise on transmission of the first signal.

17. The apparatus of claim 16, wherein:
the processor is configured to generate a linear receiver filter for the first signal; and
the processor is configured to de-correlate the first signal and interferences to generate the first estimate component for estimating the first signal, the first interference component, and the first noise component.

18. The apparatus of claim 17, wherein the linear receiver filter for the first signal $x_j$ is $s^* r_{1 \times N} = s^* [R_x]_{jth\ row} H^H (HR_x H^H + R_n)^{-1}$, wherein $x = [x_1 \, x_2 \ldots x_K]^T$ is the set of signals, $R_x = E[xx^H]$ is a correlation matrix of $x = [x_1 \, x_2 \ldots x_K]^T$, H represents a combined impact of the channel and the coding process, and the channel has a noise vector n with a correlation matrix $R_n = E[nn^H]$, a scalar number is denoted as s, the first estimate component for the first signal $x_j$ is $\frac{1}{[R_x]_{jj}} rH[R_x]_{jth\ column} x_j,$ the first interference component is $$rHx - \frac{1}{[R_x]_{jj}} rH[R_x]_{jth\ column} x_j,$$

and a signal to interference and noise ratio (SINR) for the first signal is $$SINR = \frac{\frac{1}{[R_x]_{jj}}|rH[R_x]_{jth\,column}|^2}{rHR_xH^Hr^H - \frac{1}{[R_x]_{jj}}|rH[R_x]_{jth\,column}|^2 + rR_nr^H}.$$

19. The apparatus of claim 16, wherein the apparatus is an user equipment (UE).

20. An apparatus for signal processing in a communication system, the apparatus comprising:
 a receiver configured to receive a transmitted signal sent by a transmitter through a channel, the transmitted signal being generated from a set of signals according to a coding process, the set of signals comprising a first signal and a plurality of other signals, the coding process defining a correlation relationship amongst the first signal and the plurality of other signals in the set, and including a correlation information relating to the correlation relationship in the transmitted signal; and
 a processor configured to generate a linear receiver filter for the first signal, and to decode, in accordance with the correlation information, the transmitted signal into a first estimate component for estimating the first signal, a first interference component indicating interference resulting from the correlation relationship, and a first noise component indicating impact of the noise on transmission of the first signal.

21. The apparatus of claim 20, wherein the linear receiver filter for the first signal $x_j$ is $s^*r_{1\times N} = s^*[R_x]_{jth\,row}H^H(HR_xH^H + R_n)^{-1}$, wherein $x=[x_1\ x_2\ \ldots\ x_K]^T$ is the set of signals, $R_x = E[xx^H]$ is a correlation matrix of $x=[x_1\ x_2\ \ldots\ x_K]^T$, H represents a combined impact of the channel and the coding process, and the channel has a noise vector n with a correlation matrix $R_n = E[nn^H]$, a scalar number is denoted as s, the first estimate component for the first signal $x_j$ is $\frac{1}{[R_x]_{jj}}rH[R_x]_{jth\,column}x_j$, the first interference component is $$rHx - \frac{1}{[R_x]_{jj}}rH[R_x]_{jth\,column}x_j,$$

and a signal to interference and noise ratio (SINR) for the first signal is $$SINR = \frac{\frac{1}{[R_x]_{jj}}|rH[R_x]_{jth\,column}|^2}{rHR_xH^Hr^H - \frac{1}{[R_x]_{jj}}|rH[R_x]_{jth\,column}|^2 + rR_nr^H}.$$

* * * * *

UNITED STATES PATENT AND TRADEMARK OFFICE
CERTIFICATE OF CORRECTION

PATENT NO. : 8,731,028 B2  
APPLICATION NO. : 13/310627  
DATED : May 20, 2014  
INVENTOR(S) : Farmanbar et al.

Page 1 of 1

It is certified that error appears in the above-identified patent and that said Letters Patent is hereby corrected as shown below:

In the Claims

Col. 11, line 56, claim 11, delete "$s*r_{1xN} = s*[R_x]_{jth\ row} H^H (HR_x H^H + R_n)^{-1}$," and insert -- $s*r_{1xN} = s*[R_x]_{jth\ row} H^H (HR_x H^H + R_n)^{-1}$ --.

Signed and Sealed this  
Fifth Day of August, 2014

Michelle K. Lee  
*Deputy Director of the United States Patent and Trademark Office*